US011904794B2

(12) United States Patent
Buttolo et al.

(10) Patent No.: US 11,904,794 B2
(45) Date of Patent: Feb. 20, 2024

(54) PET RESTRAINT SYSTEM FOR A VEHICLE

(71) Applicant: Ford Global Technologies, LLC, Dearborn, MI (US)

(72) Inventors: Pietro Buttolo, Dearborn Heights, MI (US); Stuart C. Salter, White Lake, MI (US); Marguerite Lynn Kimball, Brighton, MI (US); Benjamin Yilma, Canton, MI (US); Annette Lynn Huebner, Highland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 599 days.

(21) Appl. No.: 17/160,691

(22) Filed: Jan. 28, 2021

(65) Prior Publication Data

US 2022/0234538 A1    Jul. 28, 2022

(51) Int. Cl.
*B60R 22/10* (2006.01)
*A01K 27/00* (2006.01)
*B60R 22/40* (2006.01)
*B60N 2/00* (2006.01)
*B60R 22/46* (2006.01)

(52) U.S. Cl.
CPC ............ *B60R 22/10* (2013.01); *A01K 27/004* (2013.01); *B60N 2/002* (2013.01); *B60R 22/40* (2013.01); *B60R 22/46* (2013.01); *B60R 2022/469* (2013.01)

(58) Field of Classification Search
CPC ......... B60R 22/10; B60R 22/40; B60R 22/46; B60R 2022/469; B60R 2022/404; B60R 2022/4666; B60R 22/41; A01K 27/004; B60N 2/002
See application file for complete search history.

(56) References Cited

U.S. PATENT DOCUMENTS

| 4,324,204 A | * | 4/1982 | Friedman | A01K 1/0272 |
| | | | | 280/801.1 |
| 5,035,203 A | * | 7/1991 | Cardenas | A01K 27/002 |
| | | | | 280/801.1 |
| 5,724,920 A | | 3/1998 | Meisman et al. | |
| 5,915,335 A | * | 6/1999 | Holt, Jr. | A01K 1/0263 |
| | | | | 119/770 |
| 6,101,979 A | * | 8/2000 | Wilson | A01K 1/0272 |
| | | | | 119/725 |

(Continued)

FOREIGN PATENT DOCUMENTS

| CN | 109839929 A | 6/2019 |
| JP | 2006219009 A | 8/2006 |

*Primary Examiner* — Paul N Dickson
*Assistant Examiner* — Timothy Wilhelm
(74) *Attorney, Agent, or Firm* — Vichit Chea; Price Heneveld LLP (57) ABSTRACT

A pet restraint system for a vehicle is provided. The pet restraint system includes a leash configured to connect to a restraint device on a pet, a wearable device comprising one of a collar and a harness configured to be worn on the pet and connected to the leash, a retractor device coupled to the leash and configured to be secured to a support structure on the vehicle, a sensor for detecting an expected condition of the vehicle, and a controller for controlling the retractor to retract or lock the leash based on the determined expected condition of the vehicle.

15 Claims, 5 Drawing Sheets

(56) References Cited

U.S. PATENT DOCUMENTS

| | | | |
|---|---|---|---|
| 6,253,713 B1* | 7/2001 | Giedeman, III | A01K 1/0272 119/771 |
| 6,591,787 B1* | 7/2003 | Gantz | B60R 22/10 297/488 |
| 6,637,377 B2* | 10/2003 | Lobanoff | A01K 1/0272 119/770 |
| 6,768,420 B2* | 7/2004 | McCarthy | H03K 17/955 340/425.5 |
| 6,834,621 B1* | 12/2004 | O'Neill | B60R 22/10 119/770 |
| 7,204,205 B2* | 4/2007 | O'Donnell | B60R 21/02 119/28.5 |
| 7,343,881 B2* | 3/2008 | Schantz | A01K 27/002 119/856 |
| 7,348,880 B2* | 3/2008 | Hules | B60R 25/1004 340/425.5 |
| 7,357,099 B2* | 4/2008 | Smith | A01K 27/002 119/856 |
| 7,512,516 B1* | 3/2009 | Widmann | G01S 13/931 702/151 |
| 7,527,017 B1 | 5/2009 | Cribb | |
| 7,600,486 B2 | 10/2009 | Ellis | |
| 7,699,348 B2* | 4/2010 | Singh | B60R 22/10 280/801.1 |
| 7,735,456 B2* | 6/2010 | Wiley | B60R 22/10 119/755 |
| 8,100,084 B1 | 1/2012 | Abramson | |
| 8,117,991 B1 | 2/2012 | Civitillo | |
| 8,146,534 B1 | 4/2012 | Robertson | |
| 8,258,932 B2 | 9/2012 | Wahlstrom | |
| 8,607,735 B1* | 12/2013 | Klinker | A01K 27/002 119/28.5 |
| 8,622,431 B2* | 1/2014 | Singh | A01K 1/0263 280/806 |
| 8,768,292 B2 | 7/2014 | Welch | |
| 9,227,484 B1 | 1/2016 | Justice et al. | |
| 9,295,234 B2* | 3/2016 | Shewfelt | A01K 1/0272 |
| 9,392,770 B2 | 7/2016 | Almeida | |
| 9,463,805 B2 | 10/2016 | Kirsch et al. | |
| 9,637,085 B2* | 5/2017 | Sanchez Huipio | A01K 11/006 |
| 9,654,103 B2 | 5/2017 | Buttolo et al. | |
| 9,744,937 B1* | 8/2017 | Leung | A01K 27/002 |
| 9,845,050 B1 | 12/2017 | Garza et al. | |
| 9,975,481 B2 | 5/2018 | Hatton et al. | |
| 10,091,972 B1 | 10/2018 | Jensen et al. | |
| 10,115,029 B1 | 10/2018 | Day et al. | |
| 10,144,381 B2* | 12/2018 | Faruque | B60R 22/46 |
| 10,189,435 B2* | 1/2019 | Templeton | A01K 27/002 |
| 10,303,961 B1 | 5/2019 | Stoffel et al. | |
| 10,352,759 B1 | 7/2019 | Jensen | |
| 10,649,061 B2 | 5/2020 | Bjorkengren | |
| 10,742,969 B1 | 8/2020 | Rohatgi et al. | |
| 10,785,604 B1 | 9/2020 | Kumar et al. | |
| 10,946,716 B2* | 3/2021 | Ireri | B60H 1/00778 |
| 11,067,452 B1 | 7/2021 | Lee et al. | |
| 11,206,815 B2* | 12/2021 | Elam | A01K 27/008 |
| 11,241,934 B2* | 2/2022 | Credo | G08B 5/00 |
| 11,562,550 B1 | 1/2023 | Asghar et al. | |
| 11,565,626 B2* | 1/2023 | Cech | G08B 21/22 |
| 11,634,101 B2* | 4/2023 | Ricart | B60N 2/0272 701/45 |
| 2002/0169583 A1 | 11/2002 | Gutta et al. | |
| 2006/0288958 A1* | 12/2006 | Schantz | A01K 27/002 119/792 |
| 2007/0131177 A1 | 6/2007 | Perkitny | |
| 2008/0246318 A1 | 10/2008 | Bothe et al. | |
| 2009/0234542 A1* | 9/2009 | Orlewski | G08B 21/22 701/45 |
| 2010/0225522 A1* | 9/2010 | DeMersseman | G01S 13/931 356/3 |
| 2010/0305816 A1 | 12/2010 | Orlewski | |
| 2011/0067648 A1* | 3/2011 | Siklosi | A01K 27/002 119/863 |
| 2012/0232749 A1* | 9/2012 | Schoenberg | B60R 21/01526 340/457 |
| 2014/0305384 A1* | 10/2014 | Ramirez | A01K 27/002 119/771 |
| 2014/0309806 A1 | 10/2014 | Ricci | |
| 2014/0309862 A1 | 10/2014 | Ricci | |
| 2014/0310739 A1 | 10/2014 | Ricci et al. | |
| 2014/0319895 A1 | 10/2014 | Lange-Mao et al. | |
| 2015/0342143 A1 | 12/2015 | Stewart | |
| 2016/0049061 A1* | 2/2016 | Scarborough | G08B 21/24 340/449 |
| 2016/0070527 A1 | 3/2016 | Ricci | |
| 2016/0227732 A1* | 8/2016 | Pompey | A01K 1/0263 |
| 2016/0272112 A1 | 9/2016 | DeGrazia et al. | |
| 2016/0357262 A1 | 12/2016 | Ansari | |
| 2018/0126872 A1* | 5/2018 | Folino | G08B 21/24 |
| 2018/0194194 A1 | 7/2018 | Lyubich et al. | |
| 2019/0016235 A1 | 1/2019 | Parida et al. | |
| 2019/0118603 A1 | 4/2019 | Feit | |
| 2019/0279447 A1 | 9/2019 | Ricci | |
| 2019/0389352 A1 | 12/2019 | Koller et al. | |
| 2020/0085004 A1 | 3/2020 | Yoo et al. | |
| 2020/0130702 A1 | 4/2020 | Ferreira et al. | |
| 2020/0282949 A1* | 9/2020 | Yamamoto | B60R 22/48 |
| 2020/0307483 A1 | 10/2020 | Topf et al. | |
| 2020/0383580 A1 | 12/2020 | Shouldice et al. | |
| 2021/0232642 A1 | 7/2021 | Ricci | |
| 2021/0272437 A1* | 9/2021 | Piccioni | B60R 22/10 |
| 2021/0392848 A1* | 12/2021 | Templeton | A01K 1/0272 |
| 2022/0112760 A1 | 4/2022 | Demele et al. | |
| 2022/0363177 A1* | 11/2022 | Salter | H04W 4/023 |
| 2023/0106673 A1 | 4/2023 | Asghar et al. | |
| 2023/0230121 A1 | 7/2023 | Chintakindi et al. | |

* cited by examiner

PET RESTRAINT SYSTEM FOR A VEHICLE

FIELD OF THE DISCLOSURE

The present disclosure generally relates to vehicle restraint systems, and more particularly relates to a restraint system for restraining a pet within the passenger cabin of a vehicle.

BACKGROUND OF THE DISCLOSURE

Automotive vehicles are commonly used to transport pets, such as dogs, cats and other animals. When traveling in a vehicle, pets may often travel without cages or other restraint devices, such that the pet is generally free to move about the passenger compartment of the cabin interior. It may be desirable to provide for enhanced restraint of the pet, particularly when the vehicle experiences dynamic motion.

SUMMARY OF THE DISCLOSURE

According to a first aspect of the present disclosure, a pet restraint system for a vehicle is provided. The pet restraint system for a vehicle includes a leash configured to connect to a restraint device on a pet, a retractor device coupled to the leash and configured to be secured to a support structure on the vehicle, a sensor for detecting an expected condition of the vehicle, and a controller for controlling the retractor device to retract or lock the leash based on the determined expected condition of the vehicle.

Embodiments of the first aspect of the disclosure can include any one or a combination of the following features:
  the sensor includes at least one of an acceleration sensor, a steering sensor, a collision sensor, and a navigation sensor;
  the sensor includes a route sensor for sensing a condition of the roadway upon which the vehicle travels;
  a wearable device comprising one of a collar and a harness configured to be worn on the pet and to connect to the leash;
  an imaging device for capturing images of a pet or harness;
  the controller determines whether the wearable device is a collar or harness and controls the retractor device based on the determined collar or harness;
  the controller may determine an agitated pet based on the images and further control the retractor device based on a detected agitated pet;
  a leash sensor for detecting the connection of the leash onto the pet restraint device;
  the leash is configured to connect to a fixed tether on the vehicle;
  the leash is configured to connect to a seat belt buckle; and
  the expected condition of the vehicle comprises dynamic motion of the vehicle.

According to a second aspect of the present disclosure, a pet restraint system for a vehicle is provided. The pet restraint system for a vehicle includes a leash configured to connect to a restraint device on a pet, a wearable device comprising one of a collar and a harness configured to be worn on the pet and connected to the leash, a retractor device coupled to the leash and configured to be secured to a support structure on the vehicle, a sensor for detecting an expected condition of the vehicle experiencing dynamic motion, and a controller for controlling the retractor to retract or lock the leash based on the determined expected condition of the vehicle.

Embodiments of the second aspect of the disclosure can include any one or a combination of the following features:
  the sensor includes at least one of an acceleration sensor, a steering sensor, a collision sensor, and a navigation sensor;
  the sensor comprises a route sensor for sensing a condition of the roadway upon which the vehicle travels;
  the pet restraint system further comprises an imaging device for capturing images of a pet;
  the controller determines whether the wearable device is a collar or harness and controls the retractor device based on the determined collar or harness;
  the controller may determine an agitated pet based on the images and further control the retractor based on a detected agitated pet;
  a leash sensor for detecting the connection of the leash onto the pet restraint device;
  the leash is configured to connect to a fixed tether on the vehicle; and
  the leash is configured to connect to a seat belt buckle.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present disclosure are disclosed herein; however, it is to be understood that the disclosed embodiments are merely exemplary of the invention that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present invention.

Figure 1:
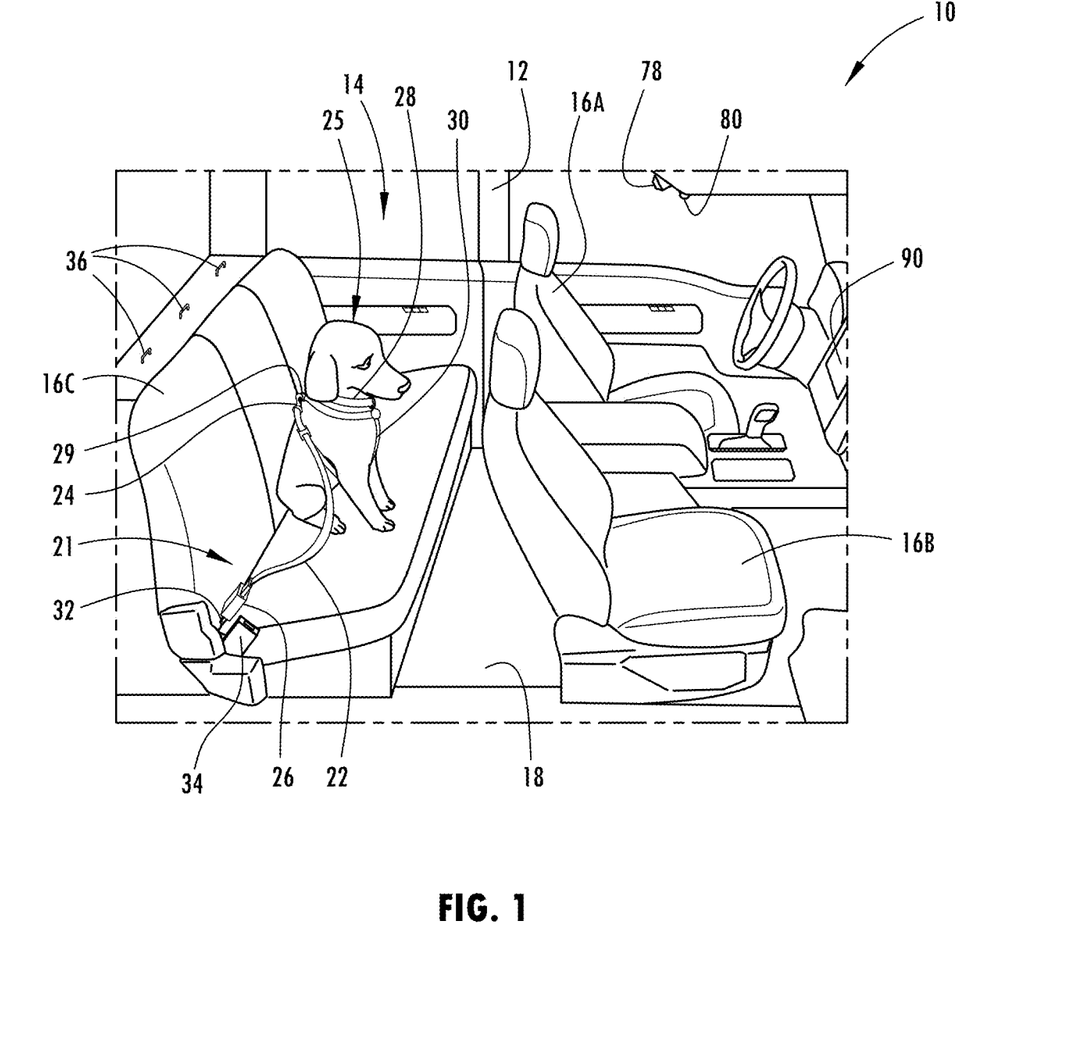
FIG. 1 is a side perspective view of a cabin interior of a vehicle containing a pet and a pet restraint system, according to one embodiment.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a pet restraint system for a vehicle. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Figure 2:
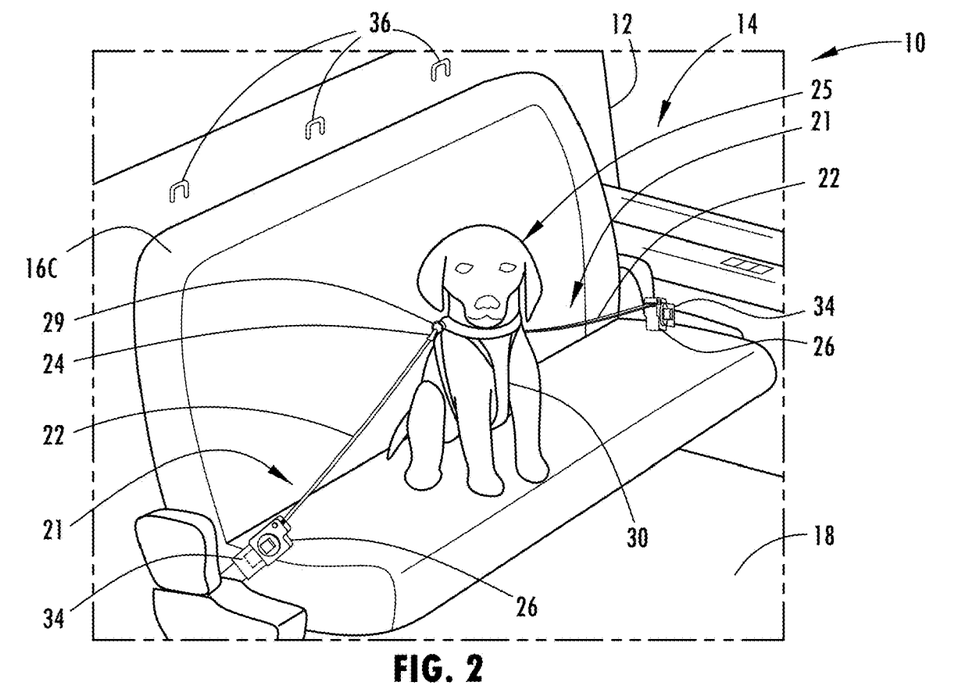
FIG. 2 is a side perspective view of a portion of the cabin interior illustrating the pet restraint system, according to another embodiment.
Figure 3:
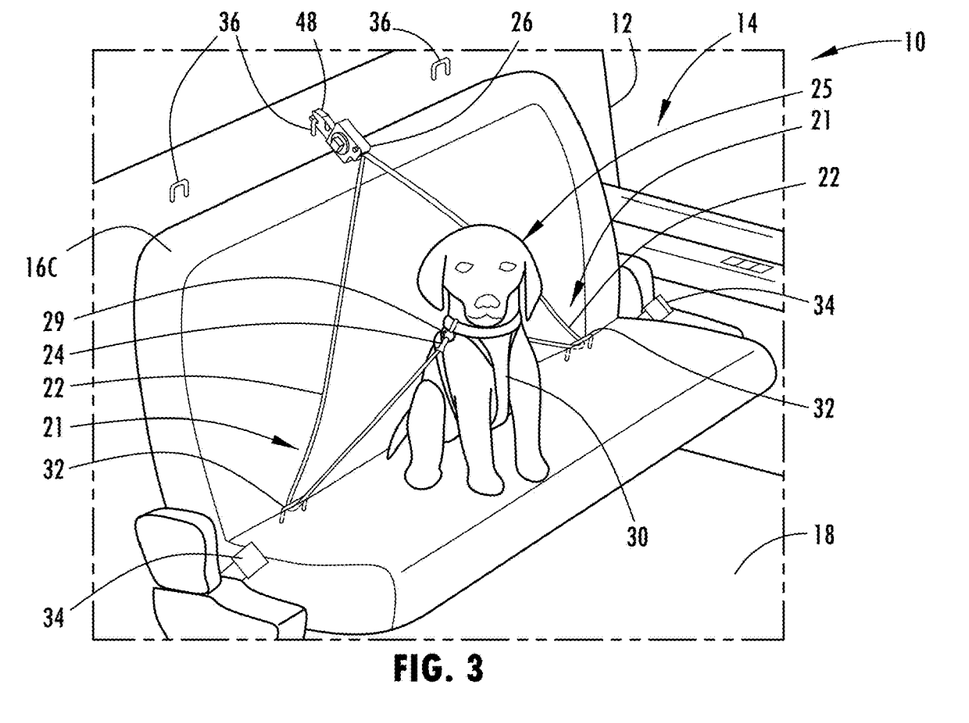
FIG. 3 is a side perspective view of a portion of the cabin interior illustrating the pet restraint system, according to a further embodiment.

Referring to FIGS. 1-3, the cabin interior 14 of a wheeled motor vehicle 10 is generally illustrated configured with passenger seating and accommodations for transporting living beings such as people and pets. The cabin interior 14 is generally defined by a vehicle body 12 and may contain various features and trim components within the vehicle body 12. The cabin interior 14 is shown having an arrangement of passenger seats including a first or front row of driver and passenger seats 16A and 16B and a second or rear row of seats shown as bench or split bench seat 16C. The vehicle 10 may also possess additional rows of seating as in the case of a large SUV, van or bus. The vehicle body 12 further defines a floor 18 upon which the seating is assembled. It should be appreciated that the vehicle 10 may be a motor vehicle, such as a wheeled car, truck, SUV, van or bus, for example, or an airplane, train, boat or other vehicle.

The vehicle 10 is further shown containing a pet 25, such as a dog, shown sitting on the rear seat 16C for travel as a passenger within the cabin interior 14 of the vehicle 10. It should be appreciated that the vehicle 10 may transport any of a number of living beings, including one or more pets such as dogs and cats, for example. The pet 25 may be located on one of the seats, the floor, a cargo area or elsewhere in the vehicle 10. The pet 25 is shown wearing a collar 28 which is equipped with a connector ring 29 configured to receive a connector clip 24 on a leash 22. The pet 25 is also shown wearing a harness 30 which is equipped with a connector ring 29 configured to receive the connector clip 24 on the leash 22. The leash 22 may be connected to one or the other or both of the collar 28 and harness 30. It should be appreciated that the pet 25 may be positioned at any of a number of locations within the cabin interior 14 of the vehicle 10 and may move about in the cabin interior 14.

The vehicle 10 is equipped with a pet restraint system 20 which is shown in one configuration in FIG. 1, according to one embodiment. The pet restraint system 20 includes the leash 22 configured to connect to a wearable restraint device such as the collar 28 or harness 30 worn on the pet 25. The leash 22 has the connector clip 24 provided at one end configured to releasably connect to the connector ring 29 on the collar 28 or the harness 30 worn on the pet 25. The leash 22 may be in the form of a strap, rope, wire or other flexible restraint member that is capable of being retracted into a retractor device.

The pet restraint system 20 also includes a retractor device 26 coupled to the leash 22 and configured to be secured to a support structure on the vehicle 10. The support structure may include one or more fixed anchors, such as a child seat anchor 32 also referred to as an ISOFIX anchor connector, a seat belt buckle 34, and other fixed structures, such as anchors 36 shown located proximate to the upper side of the seat back of rear seat 16C. The retractor device 26 receives at least a portion of the leash 22 and may actively retract the leash 22 by power rolling the leash 22 onto a roller using an electric motor to thereby shorten the extended length of the leash 22 extending from the retractor device 26. The retractor device 26 may, in addition or alternatively, actively lock or latch onto the leash 22 to prevent the leash 22 from being pulled outward and extended in length from the retractor device 26. By retracting the leash 22 into the retractor device 26 or locking the leash 22 to prevent the leash 22 from extending in length, the pet 25 may thereby be restrained. It should be appreciated that the leash 22 and retractor device 26 may be removably installed onto the vehicle 10, according to one embodiment or may be fixedly connected to the vehicle 10, according to another embodiment.

The pet restraint system 20 further includes one or more sensors for detecting an expected condition of the vehicle 10. The one or more sensors may include at least one of an acceleration sensor, a steering sensor, a collision sensor, and a navigation sensor, such as a global positioning system (GPS) sensor. The one or more sensors may provide an indication of an expected condition of the vehicle 10, such as current or expected dynamic motion of the vehicle 10 which may then be used to control the pet restraint system 20. The sensors may also include a route sensor for sensing a condition of the roadway upon which the vehicle 10 travels or is expected to travel to provide an indication of the dynamic motion that the vehicle 10 is expected to experience when traveling on the current route.

The pet restraint system 20 further includes a controller for controlling the retractor device 26 to controllably tension or lock the leash 22 based on the determined expected condition of the vehicle 10. The controller may include a dedicated or shared controller for receiving various inputs from the one or more sensors and providing an output to control the retractor device 26 based on the sensed signal(s) pursuant to a control routine.

The vehicle 10 may further be equipped with an imaging device, such as a camera 78, which may capture images of the cabin interior 14. The images captured by the camera 78 may be processed using image processing to identify the presence of a pet 25, to identify the location of the pet 25 within the cabin interior 14, and to monitor the pet 25 to determine if the pet 25 is agitated or otherwise moving about the cabin interior 14. The controller may determine the presence of an agitated pet based on the captured images and also based on audible sounds, such as a dog barking, captured by a microphone 80, and may further control the retractor device 26 based on the detected agitated pet. This may include detecting a pet 25 that is moving around the vehicle cabin interior 14 in an agitated manner or is trying to move into an undesired location within the cabin interior 14 of the vehicle 10 such as the front seats, in which case the controller may activate the retractor device 26 to restrain the pet 25. The controller may further process the images to determine whether the leash 22 is connected to the collar 28 or the harness 30 on the pet 25 and may then select parameters for leash retraction based on which of the collar 28 and harness 30 is identified. Additionally, a sensor may be employed on the leash connector clip 24 to determine if the pet 25 is connected to the leash 22.

In the embodiment shown in FIG. 1, a single leash 22 and retractor device 26 are connected to an ISOFIX anchor connector 32 on the vehicle 10 proximate to a location between the rear seat base and seat back. When one or more sensors provide an indication of an expected condition of the vehicle 10 that may require retraction or locking of the leash 22, the controller may control the retractor device 26 to retract the leash 22 within the retractor device 26 or to lock the leash 22 to prevent further extension of the leash 22 during the occurrence of the expected condition of the vehicle 10 or for a fixed time to thereby restrain the pet 25. The retractor device 26 may be fixed to any of a number of positions or fixed structures on the vehicle 10 when using a single leash 22 as shown in FIG. 1.

Referring to FIG. 2, the pet restraint system 20 is shown employing a pair of leashes 22 and retractor devices 26 on opposite lateral sides of the pet 25, according to another configuration. In this example, one of the two retractors 26 and leashes 22 is located on one side of the pet 25 and is shown connected to one seat belt buckle 34 proximate one end of the seat 16C, while the other of the two retractor devices 26 and leashes 22 is located on the opposite lateral side of the pet 25 and connected to another seat belt buckle 34 proximate an opposite end of the seat 16C. In this embodiment, the use of two leashes 22 and two retractor devices 26 on opposite lateral sides of the pet 25 may more evenly restrain the pet 25 in a central position on the seat 16C. The retractor devices 26 are controlled by the controller responsive to one or more sensors to retract and/or lock the leashes 22 based on the determined expected condition of the vehicle 10, particularly relating to the current or expected dynamic movement of the vehicle 10.

Referring to FIG. 3, the pet restraint system 20 is illustrated employing a retractor device 26 connected to a fixed anchor at a location generally above the seat back of seat 16C according to a further configuration. A pair of leashes 22 are looped through the ISOFIX seat anchor connectors 32 on opposite lateral sides of the pet 25. One end of each of the two leashes 22 is then connected by the connector clip 24 on the connector ring 29 on the collar 28 and/or harness 30 worn on the pet 25. The leashes 22 overlap at the retractor device 26 such that they are retracted together into the retractor device 26 or lock together based on a determined expected condition of the vehicle 10.

Figure 4A:
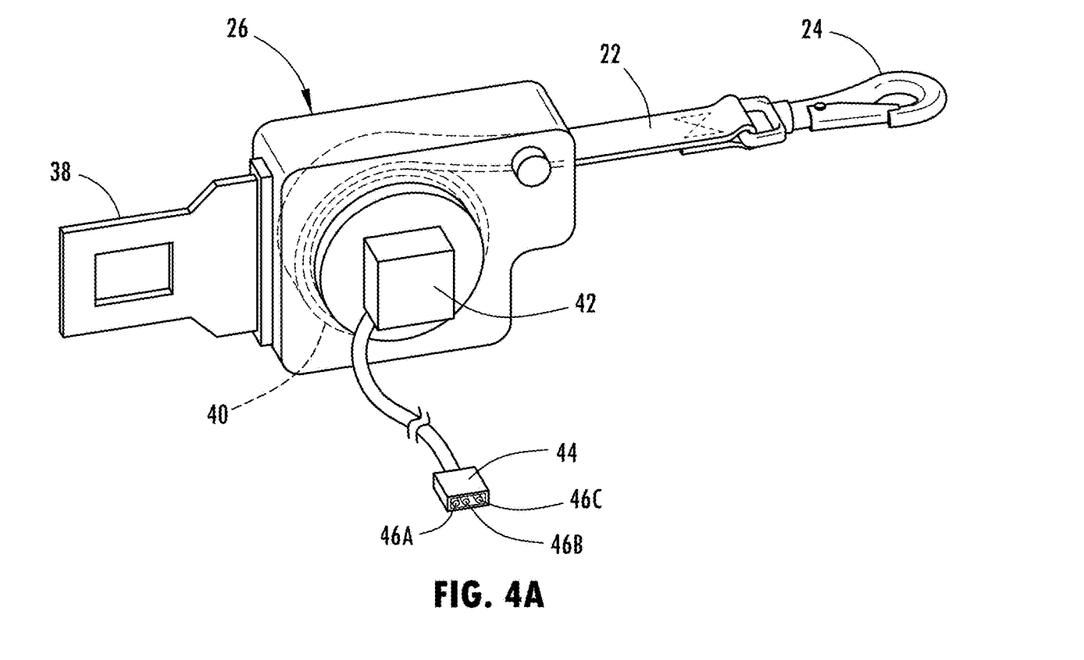
FIG. 4A is an enlarged perspective view of a leash and retractor device for tensioning and/or locking the leash, according to one example.

Referring to FIG. 4A, one example of a retractor device 26 is illustrated. The retractor device 26 is shown having the leash 22 with the connector clip 24 on one end, and the opposite end and a substantial portion of the leash 22 overlappingly rolled upon onto a roller 40 within the retractor device 26. An electric motor 42 drives the roller 40 with force in a counterclockwise motion to retract the leash 22 within the retractor device 26 or locks the roller 40 to prevent movement, particularly extension, of the leash 22. The leash 22 may extend and unwind from the roller 40 within the retractor device 26 when retraction or locking of the retractor device 26 is not activated. The electric motor 42 may lock the leash 22 in position on the roller 40 by applying a suitable resistance force or activating a latch or other lock mechanism. The retractor device 26 has an electrical connector 44 shown having power line connector pins 46A and 46B that may supply power (e.g., 12V from vehicle battery) and ground, and a data line connector pin 46C that may communicate data signals. Connector 44 may matingly engage an electrical connector on the vehicle 10 to provide electrical connection of pins 46A-46C with corresponding power and data pins on the vehicle 10. The data line 46 may then communicate with the controller. In this example, the retractor device 26 device is shown having a seat belt tongue 38 formed as a connector device to connect into a seat belt buckle which thereby fixedly supports the retractor device 26. The retractor device 26 may be removed from the seat buckle by disengaging, e.g., unlatching, the tongue 38 from the buckle 34.

Figure 4B:
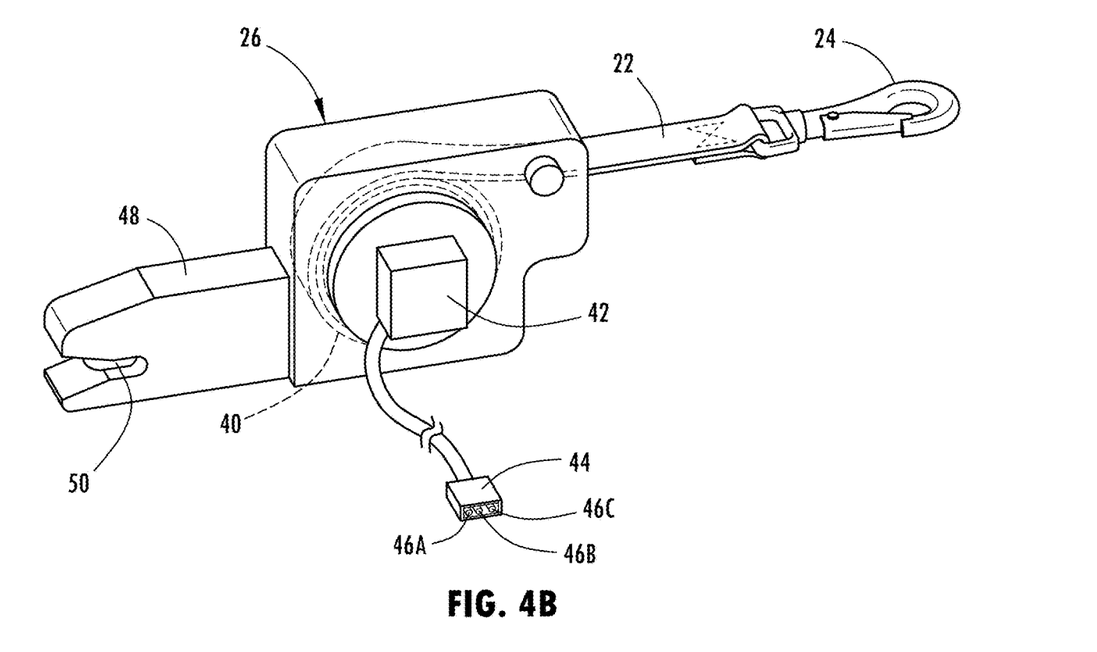
FIG. 4B is an enlarged perspective view of a leash and retractor device for tensioning and/or locking the leash, according to another example.

Referring to FIG. 4B, a retractor device 26 is shown according to another example. In this example, the retractor device 26 employs a different configuration of a connector 48 which has a latching mechanism 50 configured to engage an anchor bar on the ISOFIX anchor connector. As such, connector 48 may connect to the ISOFIX anchor connector to provide support to a fixed structure on the vehicle 10. The retractor device 26 may be unlatched from the anchor connector when not in use.

Figure 5:
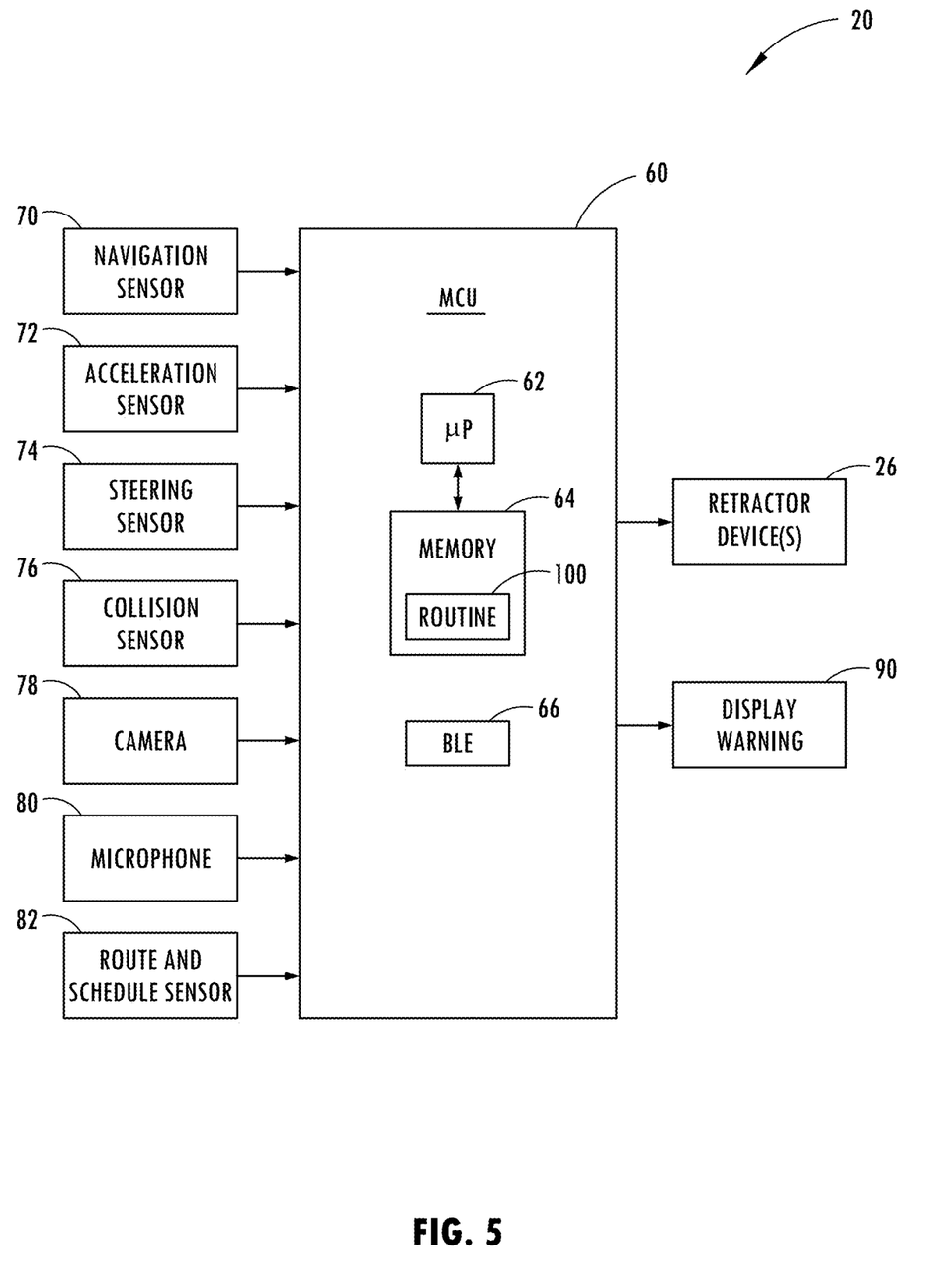
FIG. 5 is a block diagram illustrating the pet restraint system and related controls, according to one embodiment.

Referring to FIG. 5, the pet restraint system 20 is further illustrates showing the various inputs and outputs coupled to a controller 60. The pet restraint system 20 includes the controller 60 shown as a micro control unit (MCU) which may include a microprocessor 62 and memory 64. The controller 60 may employ other analog and/or digital control circuitry, according to other examples. Stored within memory 64 and executed by microprocessor 62 is a control routine 100. The controller 60 receives various inputs from one or more sensors including navigation sensor 70, acceleration sensor 72, steering sensor 74, and collision sensor 76. The controller 60 may also receive images from the camera 78 and audio signals from a microphone 80. Further, controller 60 may include route and scheduler data from sensor 82. The controller 60 processes the various inputs and provides one or more outputs to the retractor device(s) 26 and may further provide a warning via the vehicle display 90 indicating the leash is being retracted or locked. The controller 60 controls the retractor device 26 to tension or lock the leash 22 based on the determined expected condition of the vehicle 10 as sensed by the various sensors. As such, as the vehicle experiences or is shortly expected to experience dynamic motion, the acceleration sensor 72, steering sensor 74 and/or collision sensor 76 may provide a signal indicative of the desire or need to retract the leash. When the expected condition of the vehicle is about to experience certain maneuvers, such as one or more maneuvers sensed by the navigation system 70 which may include a global position system sensor (GPS) or a known route and schedule is sensed by a sensor 82, the retractor device 26 may likewise be controlled to retract and/or lock the leash 22 to thereby provide a tension force on the leash 22 during such an event.

The controller 60 may further be configured to include wireless communication, such as a short range RF signal, e.g., Bluetooth®, to communicate wirelessly with the retractor device 26. This may enable data to be shared between the controller 60 and the retractor device 26 without the need for a separate hardwired data line. It should be appreciated that other types of wired and wireless connections may be employed to communicate between the retractor device 26 and the controller 60. Further, the pet 25 may be equipped with a wireless transceiver or transmitter on the collar 28 or harness 30 to communicate with the vehicle controller and/or retractor device to provide a signal that may be processed to monitor location of the pet 25.

Figure 6:
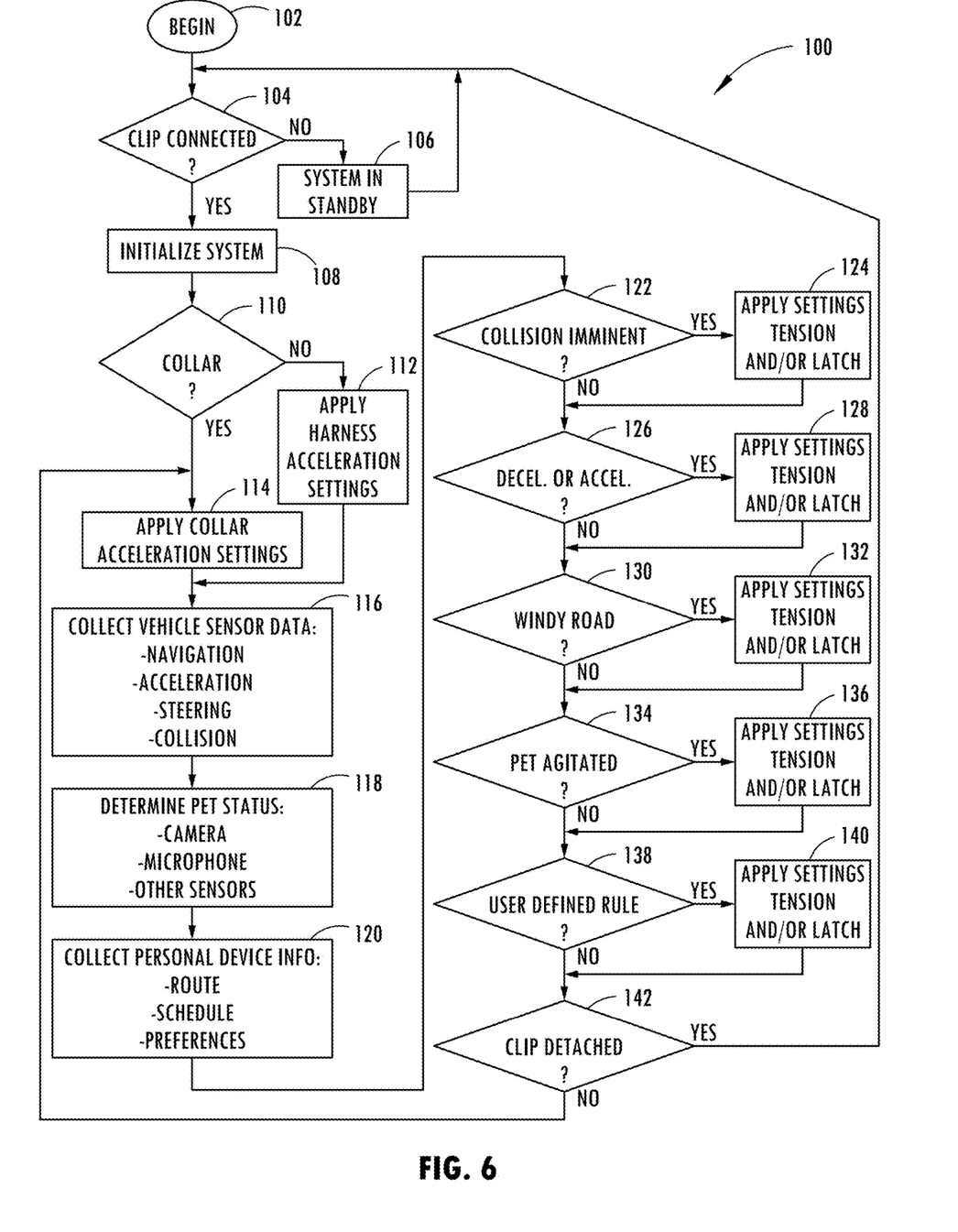
FIG. 6 is a flow diagram illustrating a routine for controlling the pet restraint system, according to one example.

Referring to FIG. 6, the routine 100 for controlling the pet restraint system 20 is illustrated, according to one example. Routine 100 begins at step 102 and proceeds to step 104 to determine if the leash connector clip is connected onto the pet and, if not, places the system into standby, and returns to step 104. The leash connector clip can be determined to be connected to the pet based on a sensor provided on the clip or by processing video images generated by a camera. If the leash connector clip is determined to be connected to a pet, routine 100 proceeds to step 108 to initialize the pet restraint system, and then to step 110 to determine if the leash is connected onto a collar on the pet. If the leash is determined to be connected onto a collar, routine 100 applies the collar acceleration settings in step 114. Otherwise, routine 100 applies the harness acceleration settings in step 112. It should be appreciated that the collar and harness acceleration settings may differ from one another to accommodate different allowable forces applied to the pet for collar and harness use. Next, routine 100 proceeds to step 116 to collect vehicle sensor data, which may include navigation, acceleration, steering and collision data as sensed by one or more sensors. Routine 100 then proceeds to step 118 to determine the status of the pet. This may be determined based on images from the camera, audio from the microphone or other sensors. The status may include the pet is quiet and laying down on the seat, or the pet is moving about in the cabin interior, or the pet is barking or making other noises indicative of any agitated pet. Next, at step 120, routine 100 collects personal device information which may include travel route, travel schedule, and driving preferences from one or more controller devices, such a vehicle controller, a smartphone or other electronic device.

Routine 100 then proceeds to step 122 to determine an expected condition of the vehicle, such as whether a collision is imminent and, if so, applies settings to retract and thereby apply tension and/or latch or lock the leash for such an event at step 124. Next, at decision step 126, routine 100 determines if the vehicle is experiencing deceleration or acceleration and applies settings to tension and/or latch the leash for such an event. Next, at decision step 130, routine 100 determines if the vehicle is driving or approaching a winding road, and, if so, applies settings to retract and thereby apply tension and/or latch the leash for such an event at step 132. At decision step 134, routine 100 determines if the pet is agitated as determined by the pet status and, if so, applies settings to retract and thereby apply tension and/or latch the leash for such an event at step 136. At decision step 138, routine 100 looks to see if there are user defined rules such as specific situations where the driver requests a desired leash length and/or a pretension force, and, if so, applies settings to retract and thereby apply tension and/or latch the leash for such an event at step 140. Finally, at step 142, routine 100 determines if the leash clip has been detached and, if so, returns to step 104. Otherwise, routine 100 returns to step 114.

Accordingly, the pet restraint system 20 advantageously controls the leash 22 on a pet 25 to retract and/or lock the leash 22 such as to provide tension on the leash based on determined expected conditions of the vehicle 10. The pet 25 may thereby be restrained during travel.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A pet restraint system for a vehicle, comprising:
a leash configured to connect to a restraint device on a pet;
a wearable device comprising one of a collar and a harness configured to be worn on the pet and to connect to the leash;
an imaging device for capturing images of the pet or the wearable device;
a retractor device coupled to the leash and configured to be secured to a support structure on the vehicle;
a sensor for detecting an expected condition of the vehicle; and
a controller for controlling the retractor device to retract or lock the leash based on the determined expected condition of the vehicle, wherein the controller determines whether the wearable device is a collar or harness and controls the retractor device based on the determined collar or harness.

2. The pet restraint system of claim 1, wherein the sensor comprises at least one of an acceleration sensor, a steering sensor, a collision sensor, and a navigation sensor.

3. The pet restraint system of claim 1, wherein the sensor comprises a route sensor for sensing a condition of the roadway upon which the vehicle travels.

4. The pet restraint system of claim 1 further comprising a leash sensor for detecting the connection of the leash onto the pet restraint device.

5. The pet restraint system of claim 1, wherein the leash is configured to connect to a fixed tether on the vehicle.

6. The pet restraint system of claim 1, wherein the leash is configured to connect to a seat belt buckle.

7. The pet restraint system of claim 1, wherein the expected condition of the vehicle comprises dynamic motion of the vehicle.

8. A pet restraint system for a vehicle, comprising:
a leash configured to connect to a restraint device on a pet;
a wearable device comprising one of a collar and a harness configured to be worn on the pet and to connect to the leash;
an imaging device for capturing images of the pet or the wearable device;
a retractor device coupled to the leash and configured to be secured to a support structure on the vehicle;
a sensor for detecting an expected condition of the vehicle; and
a controller for controlling the retractor device to retract or lock the leash based on the determined expected condition of the vehicle, wherein the controller may determine an agitated pet based on the images and further control the retractor device based on a detected agitated pet.

9. A pet restraint system for a vehicle, comprising:
a leash configured to connect to a restraint device on a pet;
a wearable device comprising one of a collar and a harness configured to be worn on the pet and connected to the leash;
an imaging device for capturing images of a pet;
a retractor device coupled to the leash and configured to be secured to a support structure on the vehicle;
a sensor for detecting an expected condition of the vehicle experiencing dynamic motion; and
a controller for controlling the retractor to retract or lock the leash based on the determined expected condition of the vehicle, wherein the controller may determine an agitated pet based on the images and further control the retractor based on a detected agitated pet.

10. The pet restraint system of claim 9, wherein the sensor comprises at least one of an acceleration sensor, a steering sensor, a collision sensor, and a navigation sensor.

11. The pet restraint system of claim 9, wherein the sensor comprises a route sensor for sensing a condition of the roadway upon which the vehicle travels.

12. The pet restraint system of claim 9, wherein the controller determines whether the wearable device is a collar or harness and controls the retractor device based on the determined collar or harness.

13. The pet restraint system of claim 9 further comprising a leash sensor for detecting the connection of the leash onto the pet restraint device.

14. The pet restraint system of claim 9, wherein the leash is configured to connect to a fixed tether on the vehicle.

15. The pet restraint system of claim 9, wherein the leash is configured to connect to a seat belt buckle.

* * * * *